US012039692B2

(12) United States Patent
Miyashita et al.

(10) Patent No.: US 12,039,692 B2
(45) Date of Patent: Jul. 16, 2024

(54) PANORAMIC IMAGE SYNTHESIS DEVICE, PANORAMIC IMAGE SYNTHESIS METHOD AND PANORAMIC IMAGE SYNTHESIS PROGRAM

(71) Applicant: Nippon Telegraph and Telephone Corporation, Tokyo (JP)

(72) Inventors: Hiromu Miyashita, Musashino (JP); Masayoshi Chikada, Musashino (JP); Megumi Isogai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 385 days.

(21) Appl. No.: 17/599,439

(22) PCT Filed: Apr. 10, 2020

(86) PCT No.: PCT/JP2020/016061
§ 371 (c)(1),
(2) Date: Sep. 28, 2021

(87) PCT Pub. No.: WO2020/218024
PCT Pub. Date: Oct. 29, 2020

(65) Prior Publication Data
US 2022/0180475 A1 Jun. 9, 2022

(30) Foreign Application Priority Data
Apr. 24, 2019 (JP) .................................. 2019-082591

(51) Int. Cl.
*G06T 7/174* (2017.01)
*G06T 3/4038* (2024.01)
(Continued)

(52) U.S. Cl.
CPC ............ *G06T 3/4038* (2013.01); *G06T 7/194* (2017.01); *G06T 7/248* (2017.01); *G06V 20/46* (2022.01);
(Continued)

(58) Field of Classification Search
CPC ....... G06T 3/4038; G06T 7/194; G06T 7/248; G06T 2207/10016; G06T 2207/10021;
(Continued)

(56) References Cited

U.S. PATENT DOCUMENTS

| 6,373,564 | B1 * | 4/2002 | Park ........................ G01M 11/37 356/73.1 |
| 6,434,275 | B1 * | 8/2002 | Fukuda .................. H04N 19/40 382/268 |
| 7,127,125 | B2 * | 10/2006 | Perlmutter ............. H04N 5/262 382/284 |
| 8,290,040 | B2 * | 10/2012 | Li ........................ H04N 19/573 375/240.12 |

(Continued)

FOREIGN PATENT DOCUMENTS

JP 2018026744 2/2018

Primary Examiner — Philip P. Dang
(74) Attorney, Agent, or Firm — Fish & Richardson P.C.

(57) ABSTRACT

Provided is a panoramic video composition apparatus that suppresses a double image or a defect of an object even when the object moves to traverse an overlap region between cameras. In a panoramic video composition apparatus that composes a panoramic video by coupling a plurality of videos, the panoramic video composition apparatus includes an afterimage generation unit 10 configured to acquire a background image as a background and a reference image as a reference of the panoramic video from frame images constituting a video for each of videos from different angles of view, extract moving regions in which an object moves from differences between the background image and the frame images, and generate an afterimage by overlapping the extracted moving regions in order of the frame images, a feature point calculation unit 20 configured to obtain a plurality of feature points from each of the reference image and the afterimage, generate a set of feature points by (Continued)

adding the feature points, and calculate a feature value of each feature point, and a transformation parameter generation unit 30 configured to search for feature points of which feature values match each other by comparing the feature points of the set of feature points before and after the frame image, and generate a first transformation parameter indicating a degree of distorting the frame image from differences between coordinates of the feature points.

6 Claims, 13 Drawing Sheets

(51) Int. Cl.
    *G06T 7/194*     (2017.01)
    *G06T 7/246*     (2017.01)
    *G06V 20/40*     (2022.01)

(52) U.S. Cl.
    CPC .... *G06V 20/48* (2022.01); *G06T 2207/10016* (2013.01)

(58) Field of Classification Search
    CPC . G06T 2207/30196; G06T 2207/30221; G06T 7/11; G06T 7/174; G06V 20/46; G06V 20/48; G06V 10/16; H04N 23/60; G03B 15/00
    See application file for complete search history.

(56) References Cited

U.S. PATENT DOCUMENTS

| | | | | |
|---|---|---|---|---|
| 8,446,957 | B2* | 5/2013 | Kurata | H04N 19/53 |
| | | | | 375/240.16 |
| 8,494,051 | B2* | 7/2013 | Li | H04N 19/527 |
| | | | | 375/240.16 |
| 9,025,847 | B2* | 5/2015 | Kitamura | A61B 3/0058 |
| | | | | 378/4 |
| 9,147,260 | B2* | 9/2015 | Hampapur | G06T 7/246 |
| 9,396,529 | B2* | 7/2016 | Tsubota | G06T 5/80 |
| 9,533,618 | B2* | 1/2017 | Zhang | B60R 1/00 |
| 9,860,525 | B2* | 1/2018 | Karimi-Cherkandi | |
| | | | | H04N 7/025 |
| 10,255,665 | B2* | 4/2019 | Suzuki | H04N 25/611 |
| 10,311,633 | B2* | 6/2019 | Roimela | G06F 3/04815 |
| 10,764,496 | B2* | 9/2020 | Chen | H04N 23/70 |
| 11,250,546 | B2* | 2/2022 | Pu | G06N 3/04 |
| 2005/0286786 | A1* | 12/2005 | Noda | H04N 19/194 |
| | | | | 375/E7.176 |
| 2007/0104276 | A1* | 5/2007 | Ha | H04N 19/593 |
| | | | | 375/E7.266 |
| 2012/0321166 | A1* | 12/2012 | Kitamura | A61B 3/102 |
| | | | | 382/131 |
| 2013/0033623 | A1* | 2/2013 | Matsuyama | H04N 23/689 |
| | | | | 348/241 |
| 2014/0002589 | A1* | 1/2014 | Auberger | G06T 7/20 |
| | | | | 348/36 |
| 2014/0049635 | A1* | 2/2014 | Laffargue | G01F 17/00 |
| | | | | 348/135 |

* cited by examiner

FRAME IMAGE  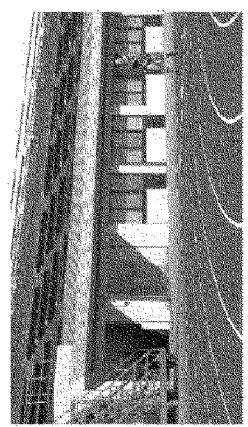 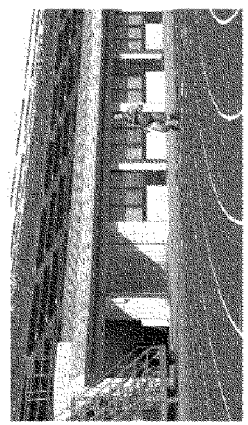
MOVING REGION 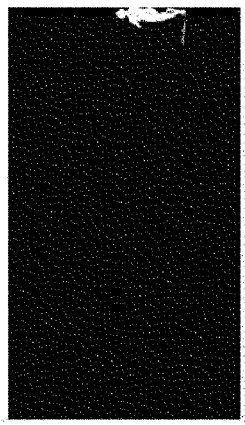 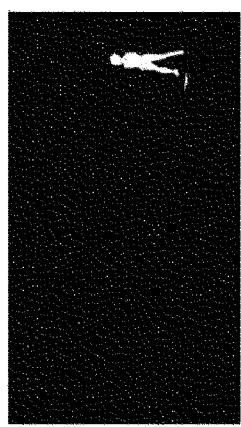 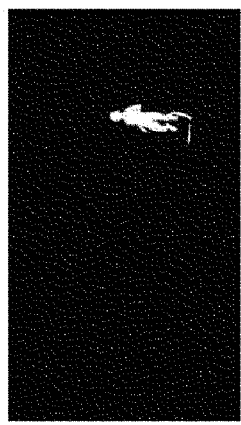
AFTERIMAGE 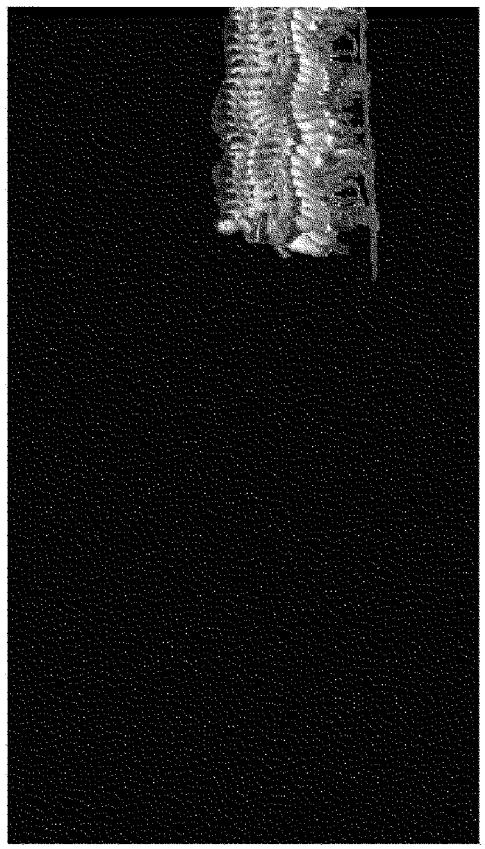
Fig. 4

PANORAMIC IMAGE SYNTHESIS DEVICE, PANORAMIC IMAGE SYNTHESIS METHOD AND PANORAMIC IMAGE SYNTHESIS PROGRAM

CROSS-REFERENCE TO RELATED APPLICATIONS

This application is a National Stage application under 35 U.S.C. § 371 of International Application No. PCT/JP2020/016061, having an International Filing Date of Apr. 10, 2020, which claims priority to Japanese Application Serial No. 2019-082591, filed on Apr. 24, 2019. The disclosure of the prior application is considered part of the disclosure of this application, and is incorporated in its entirety into this application.

TECHNICAL FIELD

The present disclosure relates to a panoramic video composition apparatus, a panoramic video composition method, and a panoramic video composition program for receiving, as inputs, a plurality of videos captured from different angles of view and outputting a panoramic video by coupling these videos.

BACKGROUND ART

A technology for receiving, as inputs, videos captured such that partial regions are overlapped with each other by a plurality of cameras with different angles of view and outputting a wide-angle panoramic video by coupling these videos has been widely known as panoramic video composition. In the panoramic video composition, a method for detecting correspondence points at which the same object appears by matching feature points included in frame images and coupling the frame images based on the correspondence points has been proposed.

For example, Patent Literature 1 proposes a method for acquiring seam information indicating a joining line along which a plurality of high-resolution videos is coupled to couple the videos at a high speed and with high accuracy. In this method, weighting of a region is changed such that as the region is easy to be employed as the seam information becomes closer to the seam information employed in the past frame image in searching the seam information of the current frame image. In accordance with this method, the joining line which is a boundary between the cameras is dynamically changed in response to transition of the frame image, and thus, a double image or a defect in an object occurring may be avoided when the joining line is overlapped with the object present in the overlap region. That is, flickering of the object is suppressed, and thus, image quality of the panoramic video is less likely to deteriorate.

CITATION LIST

Patent Literature

Patent Literature 1: JP 2018-26744 A

SUMMARY OF THE INVENTION

Technical Problem

However, when the object moves to traverse the overlap region, the object needs to span over the joining line in any frame images. Thus, display coordinates of the object vary significantly before and after the frame image, and thus, there is a problem in that image quality of the panoramic video deteriorates.

The present disclosure has been made in view of the aforementioned problems, and an object of the present disclosure is to provide a panoramic video composition apparatus, a panoramic video composition method, and a panoramic video composition program that suppress a double image and a defect of an object even when the object moves to traverse an overlap region between cameras.

Means for Solving the Problem

A panoramic video composition apparatus according to an aspect of the present disclosure is a panoramic video composition apparatus that composes a panoramic video by coupling a plurality of videos. The panoramic video composition apparatus includes an afterimage generation unit configured to acquire a background image as a background and a reference image as a reference of the panoramic video from frame images constituting a video for each of videos from different angles of view, extract moving regions in which an object moves from differences between the background image and the frame images, and generate an afterimage by overlapping the extracted moving regions in order of the frame images, a feature point calculation unit configured to obtain a plurality of feature points from each of the reference image and the afterimage, generate a set of feature points by adding the feature points, and calculate a feature value of each feature point, and a transformation parameter generation unit configured to search for feature points of which feature values match each other by comparing the feature points of the set of feature points before and after the frame image, and generate a first transformation parameter indicating a degree of distorting the frame image from differences between coordinates of the feature points.

A panoramic video composition method according to another aspect of the present disclosure is a panoramic video composition method executed by a panoramic video composition apparatus. The panoramic video composition method includes acquiring a background image as a background and a reference image as a reference of a panoramic video from frame images constituting a video for each of videos from different angles of view, extracting moving regions in which an object moves from differences between the background image and the frame images, and generating an afterimage by overlapping the extracted moving regions in order of the frame images, obtaining a plurality of feature points from each of the reference image and the afterimage, generating a set of feature points by adding the feature points, and calculating a feature value of each feature point, and searching for feature points of which feature values match each other by comparing the feature points of the set of feature points before and after the frame image, and generating a first transformation parameter indicating a degree of distorting the frame image from differences between coordinates of the feature points.

A panoramic video composition program according to still another aspect of the present disclosure is a panoramic video composition program causing a computer to function as the panoramic video composition apparatus.

Effects of the Invention

According to the present disclosure, it is possible to provide the panoramic video in which a double image and a defect of an object are suppressed even when the object moves to traverse an overlap region between the cameras.

BRIEF DESCRIPTION OF DRAWINGS

FIG. 4 is a diagram illustrating an example of moving regions extracted from frame images and an afterimage.

DESCRIPTION OF EMBODIMENTS

Plurality of Videos

Figure 1:
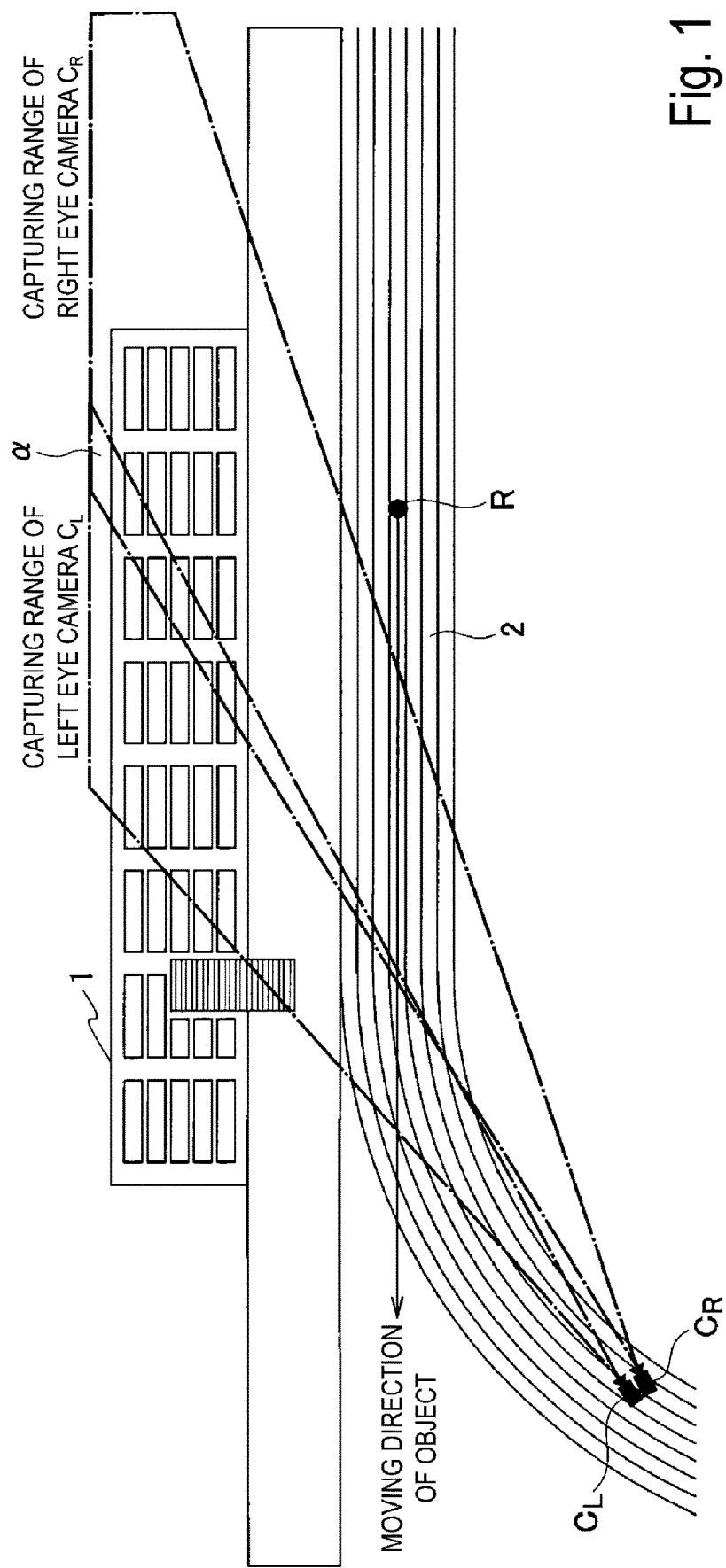
FIG. 1 is a schematic diagram illustrating an example of a positional relationship between camera devices and an object for panoramic video composition.

Before embodiments of the present disclosure are described, a plurality of videos which is sources of a panoramic video to be composed by a panoramic video composition apparatus according to the embodiments of the present disclosure will be described. The plurality of videos is captured from different angles of view. FIG. 1 is a schematic diagram illustrating an example of a positional relationship between camera devices and an object for panoramic video composition.

The videos captured from the different angles of view are, for example, videos captured by a left eye camera $C_L$ and a right eye camera $C_R$ as illustrated in FIG. 1. The left eye camera $C_L$ and the right eye camera $C_R$ are installed horizontally adjacent to each other and are held and fixed at the different angles of view to have an overlap region.

It is assumed that the left eye camera $C_L$ and the right eye camera $C_R$ capture, as an object, a runner R moving on a track 2 to traverse in a direction from the right eye camera $C_R$ to the left eye camera $C_L$ with audience seats 1 as a background. In the embodiments to be described below, a panoramic video obtained by coupling the two videos captured in the environment illustrated in FIG. 1 is composed. Note that the plurality of videos is not limited to two. The number of camera devices may be an integer of 3 or more.

Hereinafter, an embodiment of the present disclosure will be described with reference to the accompanying drawings. The same components in a plurality of drawings are denoted by the same reference signs, and thus the detailed description thereof will not be repeated.

First Embodiment

Figure 2:
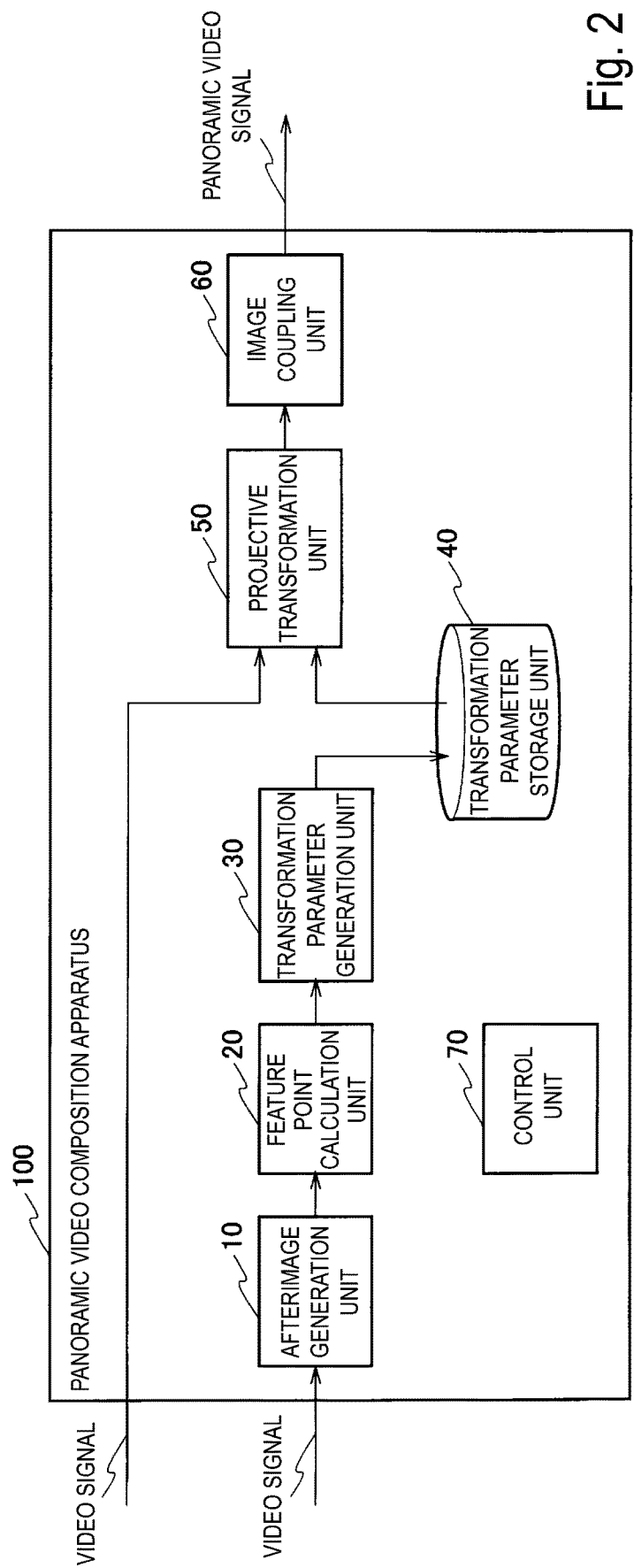
FIG. 2 is a block diagram illustrating a configuration example of a panoramic video composition apparatus according to a first embodiment of the present disclosure.

FIG. 2 is a block diagram illustrating a configuration example of a panoramic video composition apparatus according to a first embodiment of the present disclosure. Video signals input to a panoramic video composition apparatus 100 illustrated in FIG. 2 are video signals captured by the left eye camera $C_L$ and the right eye camera $C_R$.

In the present embodiment, the video signals are input in two steps of pre-processing until a first transformation parameter is generated and post-processing for composing the panoramic video after generating the first transformation parameter. The video signals input in the pre-processing and the post-processing are identical. Note that as the video signals, serial signals output by the camera devices may be directly input, or files in which the videos are recorded may be input.

The panoramic video composition apparatus 100 illustrated in FIG. 2 includes an afterimage generation unit 10, a feature point calculation unit 20, a transformation parameter generation unit 30, a transformation parameter storage unit 40, a projective transformation unit 50, an image coupling unit 60, and a control unit 70. For example, the panoramic video composition apparatus 100 may be achieved by a computer including a ROM, a RAM, a CPU, and the like. In this case, processing details of functions necessary for the panoramic video composition apparatus 100 are described in a program. The control unit 70 is a general unit that controls time-series operations of functional components.

Pre-Processing

The afterimage generation unit 10 acquires a background image as a background and a reference image as a reference of the panoramic video from frame images constituting the videos for each of the videos from different angles of view, extracts a moving region in which the object moves from differences between the background image and the frame images, and generates an afterimage by overlapping the extracted moving regions in order of the frame images. The plurality of videos is two videos captured by the left eye camera $C_L$ and the right eye camera $C_R$ in this example.

Here, a degree of distorting the frame image is an amount for distorting the frame image to fit a different frame image between the right eye camera $C_R$ and the left eye camera $C_L$ to the frame image of one of the cameras. For example, the frame image of the left eye camera $C_L$ is distorted to be fit to a shape of the frame image of the right eye camera $C_R$. As stated above, the frame image of the one camera is distorted, and thus, image quality of a panoramic image may be improved.

Figure 3:
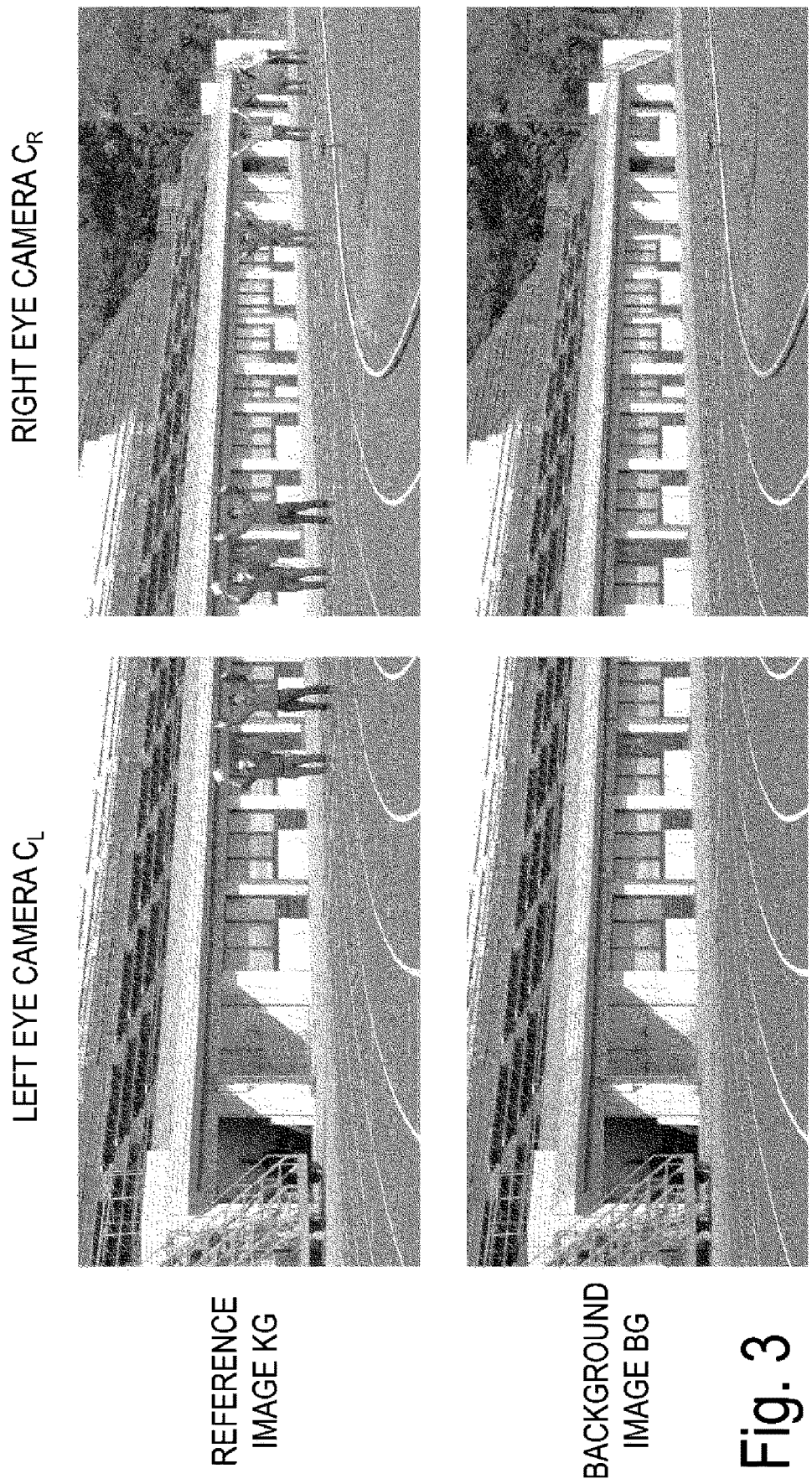
FIG. 3 is a diagram illustrating an example of a reference image and a background image.

FIG. 3 is a diagram illustrating an example of the background image and the reference image. A first row of FIG. 3 illustrates reference images KG, and a second row illustrates background images BG. As seen from the reference images KG, the video captured by the left eye camera $C_L$ and the video captured by the right eye camera $C_R$ are overlapped (overlap region α) in a range of two staffs at a left side edge.

The reference images KG are a set of frame images captured by the left eye camera $C_L$ and the right eye camera $C_R$ as a reference for obtaining a first transformation parameter indicating a degree of distorting the frame image. Feature points of the reference images KG are compared. The comparison of the feature points of the reference images KG will be described later.

Although the background images BG may be frame images identical to the reference images KG, it is desirable that the object (runner) and the like do not appear. The background images BG in this example are frame images before the staffs are present on the track 2.

The afterimage generation unit 10 extracts the moving regions in which the object R moves from the differences between the background image BG and the frame images and generates an afterimage ZG by extracting only the moving regions from the frame images and overlapping the moving regions. Processing for extracting and overlapping the moving regions is repeated in a direction from an old frame to a new frame of the frame images, and thus, the afterimage is generated. That is, the object R is recorded with a series of afterimages.

FIG. 4 is a diagram illustrating an example of the moving regions extracted from the frame images and the afterimage. A second row of FIG. 4 illustrates moving regions β, and a third row illustrates the afterimage ZG. Note that the afterimage ZG illustrated in FIG. 4 is enlarged to be easily seen.

The feature point calculation unit 20 obtains a plurality of feature points from each of the reference image KG and the afterimage ZG, generates a set of feature points by adding the feature points, and calculates a feature value of each feature point. The feature points are points indicating features of the images such as a portion at which an edge of each of the reference images KG and the afterimage ZG is distinctive, a portion at which luminance is high, and a portion at which hue is different.

The feature point calculation unit 20 calculates the feature points of the reference image KG and the afterimage ZG and the feature values corresponding to the feature points in accordance with a known method for calculating local feature values represented by SIFT, SURF, and AKAZE. The feature point calculation unit 20 calculates the feature points and the feature values from the frame images captured by the left eye camera $C_L$ and the right eye camera $C_R$.

The transformation parameter generation unit 30 searches for feature points of which feature values match each other by comparing the feature points of the set of feature points before and after the frame image, and generates the first transformation parameter indicating the degree of distorting the frame image from differences between coordinates of the feature points. Here, the comparison is processing for comparing the set of feature points obtained by adding the feature points of the reference image and the feature points of the afterimage captured by the left eye camera $C_L$ with the set of feature points obtained by adding the feature points of the reference image and the feature points of the afterimage captured by the right eye camera $C_R$.

Figure 5:
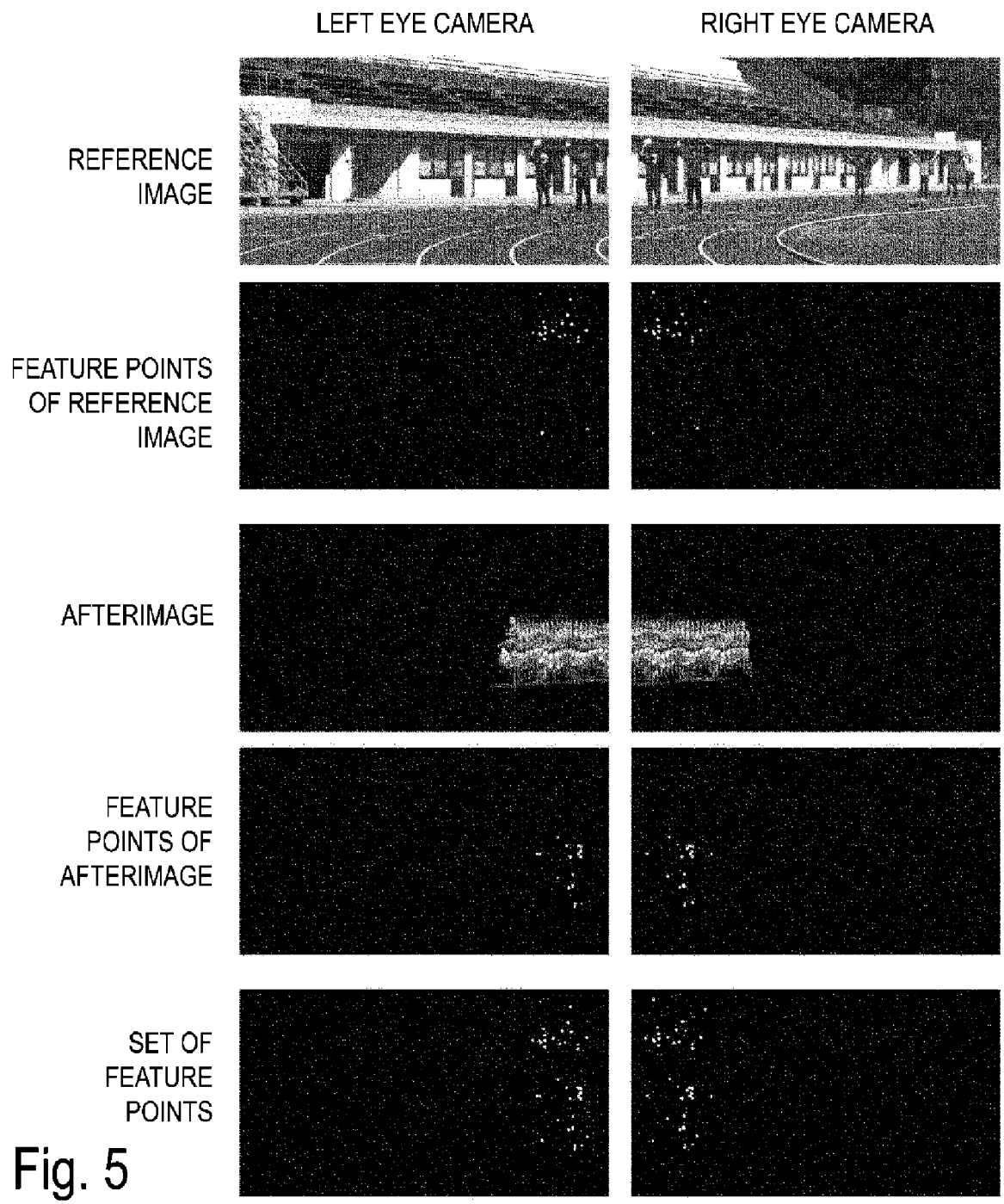
FIG. 5 is a diagram illustrating an example of a set of feature points.

FIG. 5 is a diagram illustrating an example of the set of feature points. A second row of FIG. 5 illustrates the feature points of the reference image KG in white points, and a fourth row illustrates the feature points of the afterimage ZG in white points. A fifth row of FIG. 5 illustrates the set of feature points obtained by adding the feature points of the reference image KG in the second row and the afterimage ZG in the fourth row.

The feature points included in a region that does not correspond to the object among the feature points of the afterimage ZG are manually excluded in advance, for example. As the afterimage ZG, for example, moving such as swaying of trees and opening and closing of windows in a range corresponding to the background is extracted as a afterimage (moving region) in some cases. Such a afterimage which is not the object is excluded, for example, offline.

Subsequently, the transformation parameter generation unit 30 estimates a homography matrix having the set of feature points from each angle of view as inputs in accordance with a method represented by a RANSAC algorithm. The homography matrix is a parameter to be used for projective transformation such that a certain image is superimposed on another image, and corresponds to the first transformation parameter of the present embodiment.

In the estimation of the homography matrix, the transformation parameter generation unit searches for the feature points matching each other by comparing the set of feature points of the left eye camera $C_L$ with the set of feature points of the right eye camera $C_R$, and calculates distortion between the angles of view from differences between coordinates of the plurality of matching feature points. That is, for example, the frame images of the left eye camera $C_L$ on which the projective transformation is performed by using the first transformation parameter may be overlapped with the frame images of the right eye camera $C_R$ with good continuity.

The first transformation parameter of the present embodiment is a parameter obtained by comparing the set of feature points obtained by adding the feature points of the reference image KG and the feature points of the afterimage ZG between the angles of view, and thus, both the reference image KG and the afterimage ZG may be distorted in a well-balanced manner. Even though the object is a small object, the afterimage is generated from the moving regions, and thus, an area sufficient for detecting the feature points may be ensured. As a result, the frame images may be appropriately superimposed.

The first transformation parameter is written to and stored in the transformation parameter storage unit 40. Note that the transformation parameter storage unit 40 may not be provided as long as a processing speed of the panoramic video composition apparatus 100 is high. Thus, the transformation parameter storage unit 40 is not an essential configuration.

The pre-processing is a processing until the above-described first transformation parameter is generated. Next, the post-processing for composing the panoramic video will be described.

Post-Processing

Whenever the frame image from each angle of view is input, the projective transformation unit 50 performs the projective transformation based on the first transformation parameter on the frame image. In the present embodiment, for example, the projective transformation is performed on the frame images captured by the left eye camera $C_L$ at the same point in time to be superimposed on the frame images constituting the video captured by the right eye camera $C_R$ by using the first transformation parameter.

Figure 6:
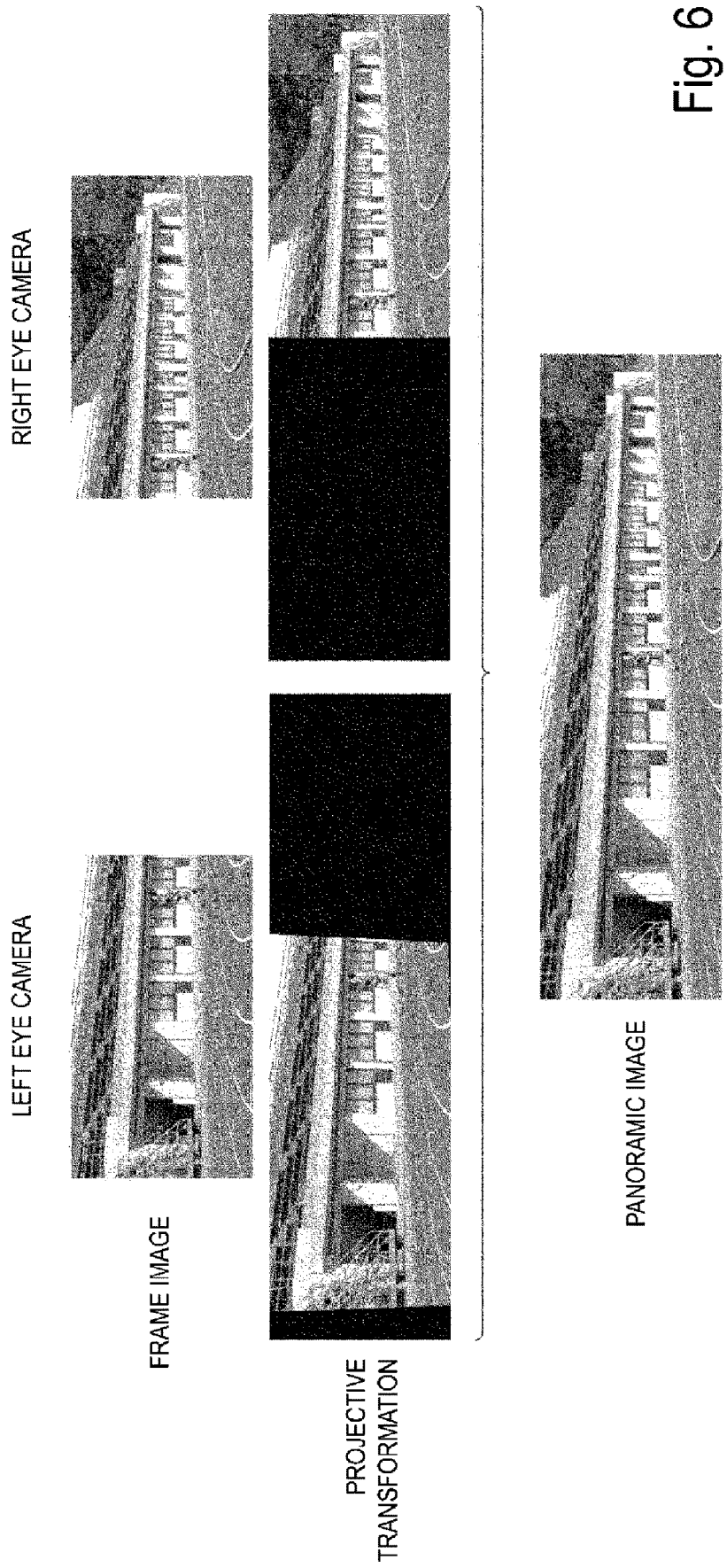
FIG. 6 is a schematic diagram illustrating an example of a panoramic image composed by the panoramic video composition apparatus illustrated in FIG. 2.

FIG. 6 is a schematic diagram illustrating an example of the panoramic image composed by the panoramic video composition apparatus 100. A first row of FIG. 6 illustrates the frame images from the angles of view.

A second row of FIG. 6 illustrates the frame images after the projective transformation. The image is distorted by the projective transformation, and thus, both edges of the image after the projective transformation of the left eye camera $C_L$ are not perpendicular. A black region in the second row indicates that pixel values of the frame image are not set.

The image coupling unit 60 couples the frame images from each angle of view on which the projective transformation is performed by using a predetermined joining line. Note that an unnecessary region may be trimmed from the coupled image. The joining line is set at any position in the overlap region α by a user, for example.

The panoramic image illustrated in a third row of FIG. 6 illustrates an example in which the joining line is set in a center of the object R (runner). A region in a left direction from the center of the object R is the frame image of the left eye camera $C_L$ and a region in a right direction from the center of the object is the frame image of the right eye camera $C_R$.

The position of the joining line and the unnecessary region may be set by the user or may be set by automatic calculation. When a pixel width is set to the joining line, a pixel values within the pixel width are step-wisely changed, and thus, the two frame images may be seamlessly coupled.

A double image or a defect of the object in the panoramic video composition is originally caused by due to a parallax between the camera devices. The amount of parallax varies depending on a distance from the camera device to the object. Thus, when two frame images are coupled with feature points of an object present at a certain depth as references, another object present at a depth different from the object is positioned in a different region (depth) on the panoramic video.

However, in accordance with the panoramic video composition apparatus 100 according to the present embodiment, both the reference image KG and the afterimage ZG may be distorted in the well-balanced manner, and thus, a panoramic video may be generated by coupling a plurality of videos in which parts of capturing regions are overlapped with high accuracy even when an object that traverses between the camera devices is present at a depth different from the background.

Panoramic Video Composition Method

Figure 7:
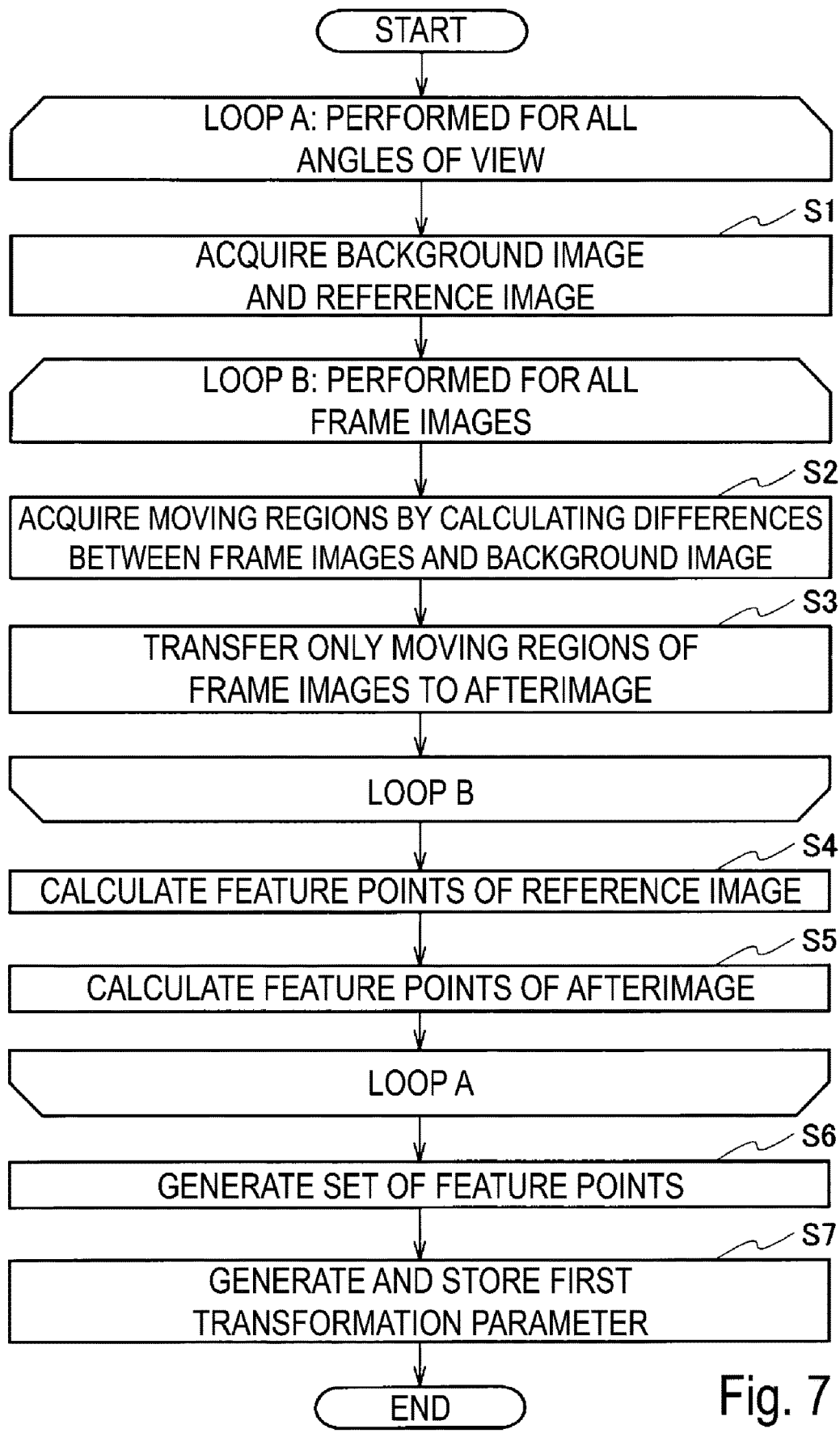
FIG. 7 is a flowchart illustrating a processing procedure of pre-processing performed by the panoramic video composition apparatus illustrated in FIG. 2.

FIG. 7 is a flowchart illustrating a processing procedure of the pre-processing performed by the panoramic video composition apparatus 100.

When the panoramic video composition apparatus 100 starts to operate, the afterimage generation unit 10 acquires the background images BG and the reference images KG from the frame videos constituting the videos captured from the different angles of view (step S1). The background images BG and the reference images KG are acquired from the frame images of both the left eye camera $C_L$ and the right eye camera $C_R$.

The background image BG is an image that is the background of the panoramic video, and is desirably an image in which the object R does not appear. The reference image KG is a neutral image in which an extra object does not appear, and may be, for example, a first frame image.

Subsequently, the afterimage generation unit 10 acquires the moving regions by calculating the differences between the frame images and the background image BG (step S2). A range of pixels having a difference by the difference calculation is the moving region.

Subsequently, the afterimage generation unit 10 transfers only the moving region from the frame image to a afterimage region by using the moving region as a mask (step S3).

This transferring is repeated in the direction from the old frame image to the new frame image of the frame images, and thus, the afterimage ZG is generated (repetition of loop B).

The feature point calculation unit 20 calculates the feature points of the reference image KG (step S4). The feature points and the corresponding feature values are calculated in accordance with the method for calculating the local feature values such as SIFT. The feature point calculation unit 20 similarly calculates the feature points and the feature values of the afterimage ZG (step S5). The calculation of the feature point calculation unit 20 is performed on all the frame images from both the angles of view (repetition of loop A).

Subsequently, the feature point calculation unit 20 generates the set of feature points obtained by adding the feature points and the feature values of the reference image KG and the feature points and the feature values of the afterimage ZG (step S6). The set of feature points is generated for each angle of view.

Subsequently, the transformation parameter generation unit 30 searches for plurality of feature points of which feature values match each other by comparing the sets of feature points, generates the first transformation parameter from the differences between the coordinates of the feature points, and stores the first transformation parameter in the transformation parameter storage unit 40 (step S7).

Figure 8:
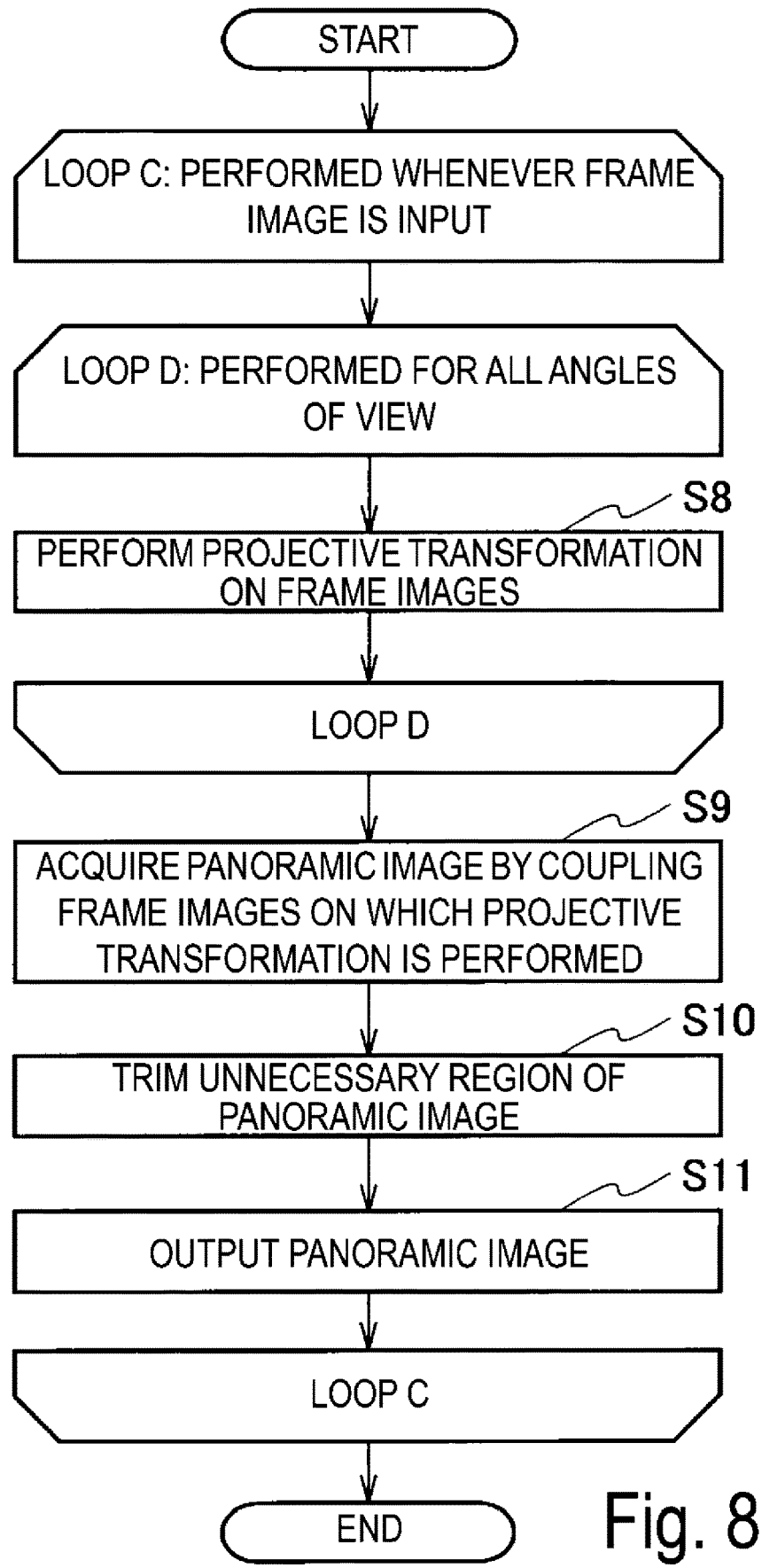
FIG. 8 is a flowchart illustrating a processing procedure of post-processing performed by the panoramic video composition apparatus illustrated in FIG. 2.

FIG. 8 is a flowchart illustrating a processing procedure of the post-processing performed by the panoramic video composition apparatus 100.

The post-processing is processing for performing the projective transformation on the frame images by using the first transformation parameter generated in the pre-processing. In the post-processing, the video identical to the video from which the first transformation parameter is generated is input to the projective transformation unit 50.

The projective transformation unit 50 performs the projective transformation based on the first transformation parameter on the frame images constituting the plurality of videos captured from the different angles of view input from the outside (step S8). The first transformation parameter used herein is generated from the identical video in the pre-processing.

In the present embodiment, for example, the projective transformation is performed on the frame images captured by the left eye camera $C_L$ by using the first transformation parameter. The projective transformation is performed on all the frame images captured by the left eye camera $C_L$ (repetition of loop D). The frame image on which the projective transformation is to be performed is designated by the user in advance. The projective transformation may be performed on the frame image captured by the right eye camera $C_R$. The projective transformation may be performed on the frame images of both the cameras.

The image coupling unit 60 acquires the panoramic image by coupling the frame images captured at the same point in time by the left eye camera CL on which the projective transformation is performed to the frame images captured by the right eye camera $C_R$ by using the predetermined joining line (step S9).

The image coupling unit 60 trims the unnecessary region of the panoramic image (step S10). The image coupling unit 60 outputs the trimmed panoramic image (step S11). The processing in step S8 to the processing in S11 are repeatedly executed for all the frame images (repetition of loop C)

Second Embodiment

Figure 9:
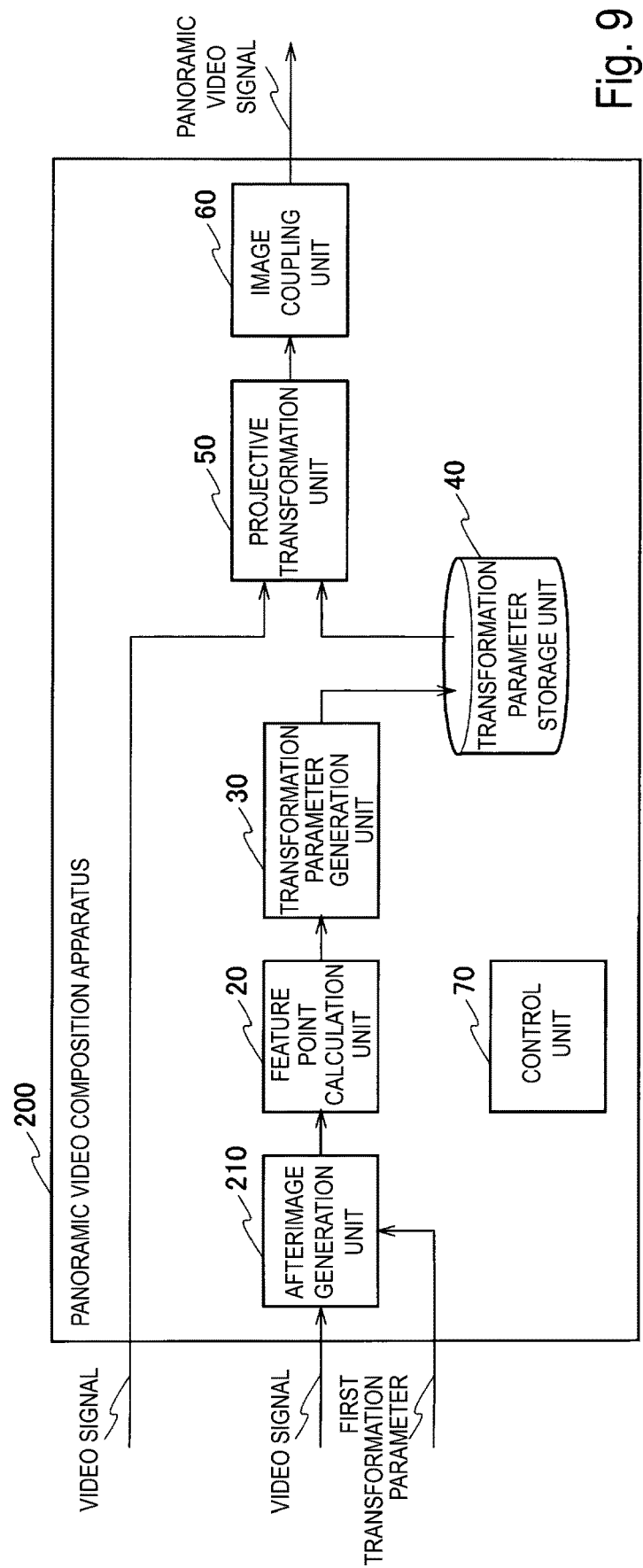
FIG. 9 is a block diagram illustrating a configuration example of a panoramic video composition apparatus according to a second embodiment of the present disclosure.

FIG. 9 is a block diagram illustrating a configuration example of a panoramic video composition apparatus according to a second embodiment of the present disclosure. In a panoramic video composition apparatus 200 illustrated in FIG. 9, an action of an afterimage generation unit 210 differs from the action of the afterimage generation unit 10 of the panoramic video composition apparatus 100.

The afterimage generation unit 210 performs the projective transformation based on the first transformation parameter on the frame images constituting the video for each of the videos at the different angles of view, acquires mismatching regions between the angles of view of the frame images on which the projective transformation is performed, performs projective transformation for returning the mismatching regions to the original frame images, and generates an afterimage by superimposing images on which non-overlap regions and non-moving regions in the mismatching regions returned to the original frame images are masked in order of the frame images.

Figure 10:
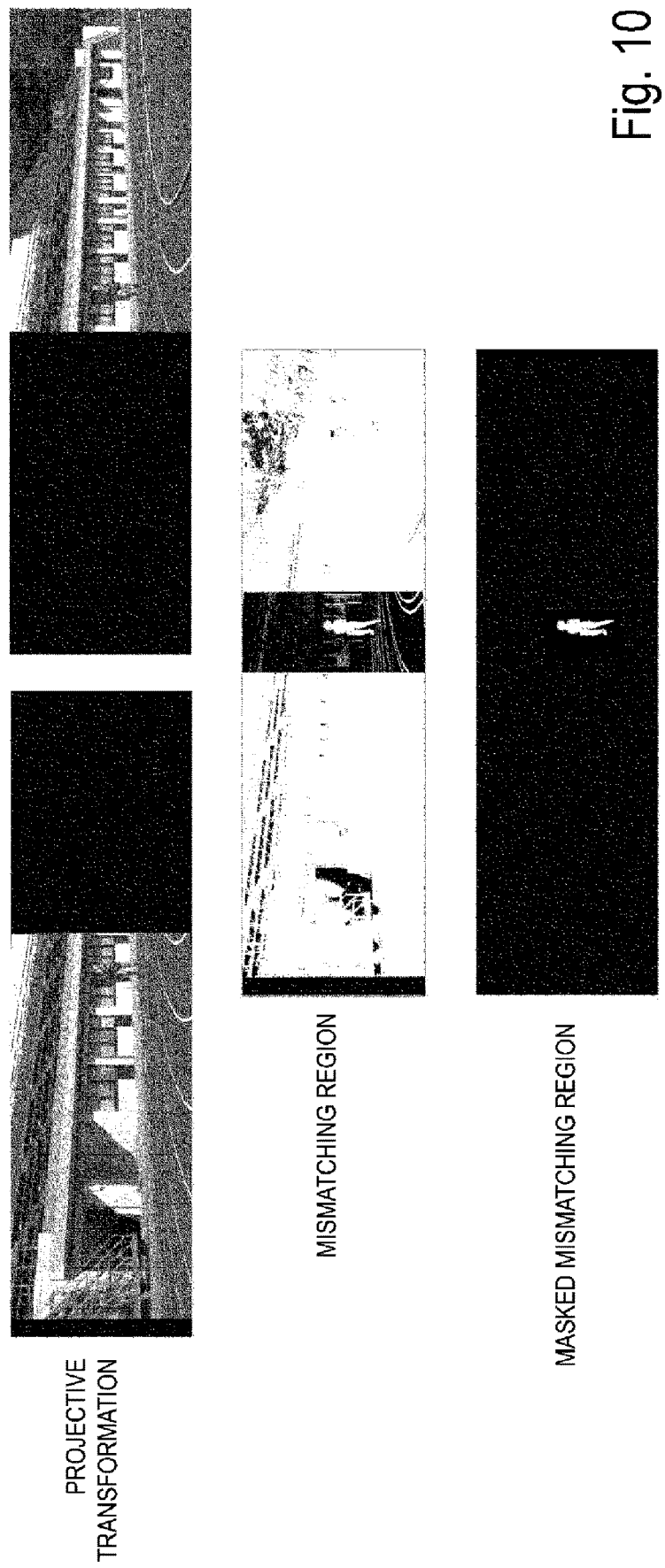
FIG. 10 is a diagram schematically illustrating an example of a mismatching region capable of being acquired by an afterimage generation unit of the panoramic video composition apparatus illustrated in FIG. 9.

FIG. 10 is a diagram schematically illustrating an example of the mismatching region capable of being acquired by the afterimage generation unit 210. A first row of FIG. 10 illustrates the frame images on which the projective transformation of the frame images is performed based on the first transformation parameter acquired in advance. A second row illustrates the mismatching region between the angles of view. A third row illustrates masks for extracting the mismatching region from the frame image.

White pixel portions of the mismatching region in the second row of FIG. 10 indicate that pixel values between the angles of view are far. Black pixel portions indicate that the pixel values between the angles of view are close. The pixel values are values of RGB and YUV, and are values obtained by calculating differences between the angles of view and adding the differences.

A central portion of the mismatching region in the second row of FIG. 10 is the overlap region α overlapped between the angles of view, and buildings on the backgrounds match. However, the objects R do not match.

That is, the mismatching region in the second row of FIG. 10 indicates a mismatching region between the image obtained by distorting the frame image of the left eye camera $C_L$ by using the first transformation parameter and the frame image of the right eye camera $C_R$.

Thus, the afterimage generation unit 210 returns the mismatching regions to the original frame images by using an inverse matrix of the first transformation parameter, and generates an afterimage ZG by superimposing the images on which the non-overlap regions and the non-moving regions in the mismatching regions returned to the original frame images are masked and extracted.

Figure 11:
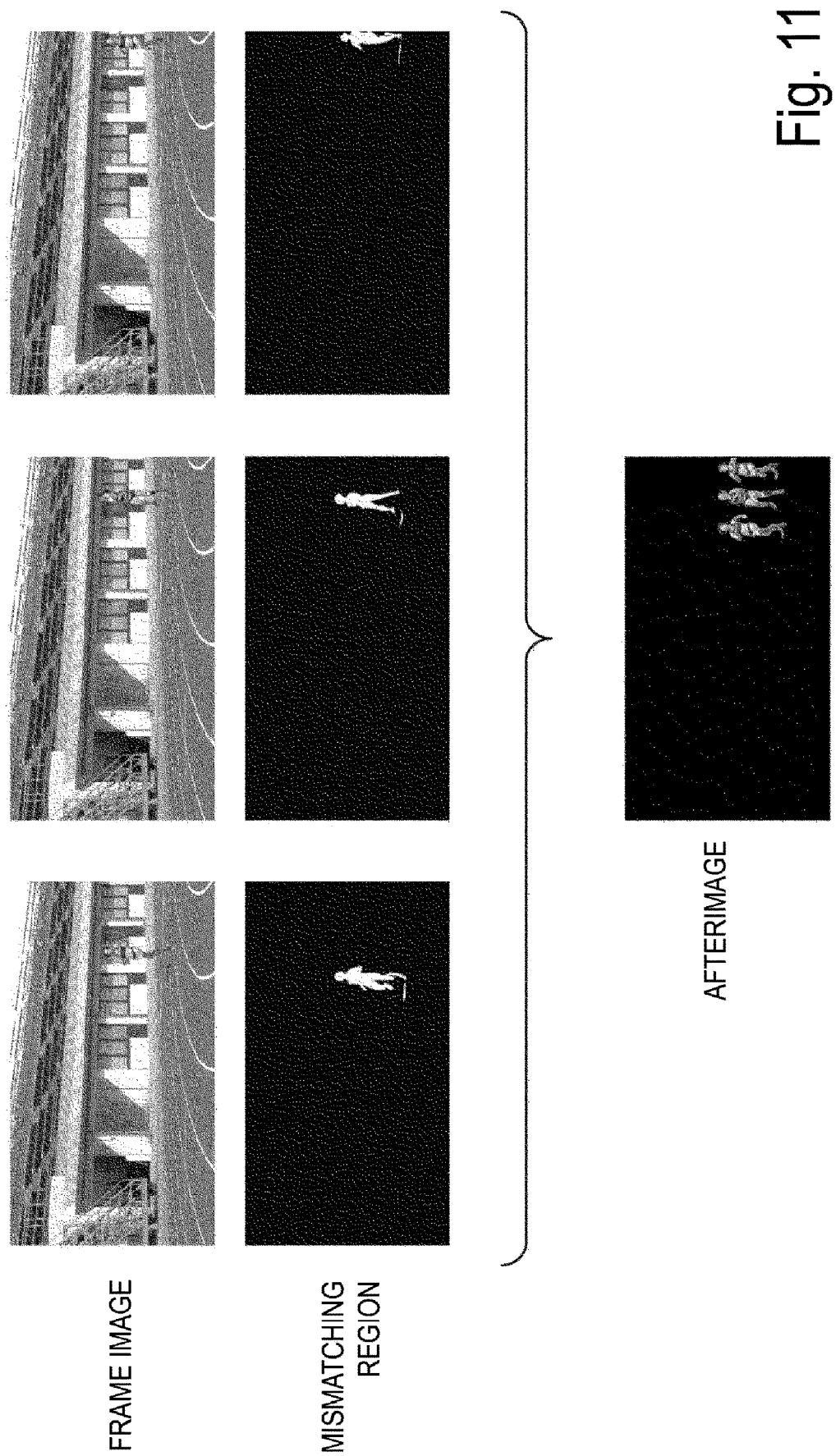
FIG. 11 is a diagram schematically illustrating an example of an afterimage generated by the afterimage generation unit of the panoramic video composition apparatus illustrated in FIG. 9.

FIG. 11 illustrates the afterimage ZG extracted from the mismatching regions returned to the original frame images. The afterimage ZG illustrated in FIG. 11 includes a range of misalignments between the frame images of the left eye camera $C_L$ and the right eye camera $C_R$.

Thus, the first transformation parameter is obtained based on the afterimage ZG generated in this manner, and thus, an image of a portion with a large misalignment between the angles of view may be intensively corrected. The afterimage ZG may be generated even when the object R appears in the frame image and the background image BG may not be acquired. That is, the afterimage ZG may be generated without using the background image BG.

Third Embodiment

Figure 12:
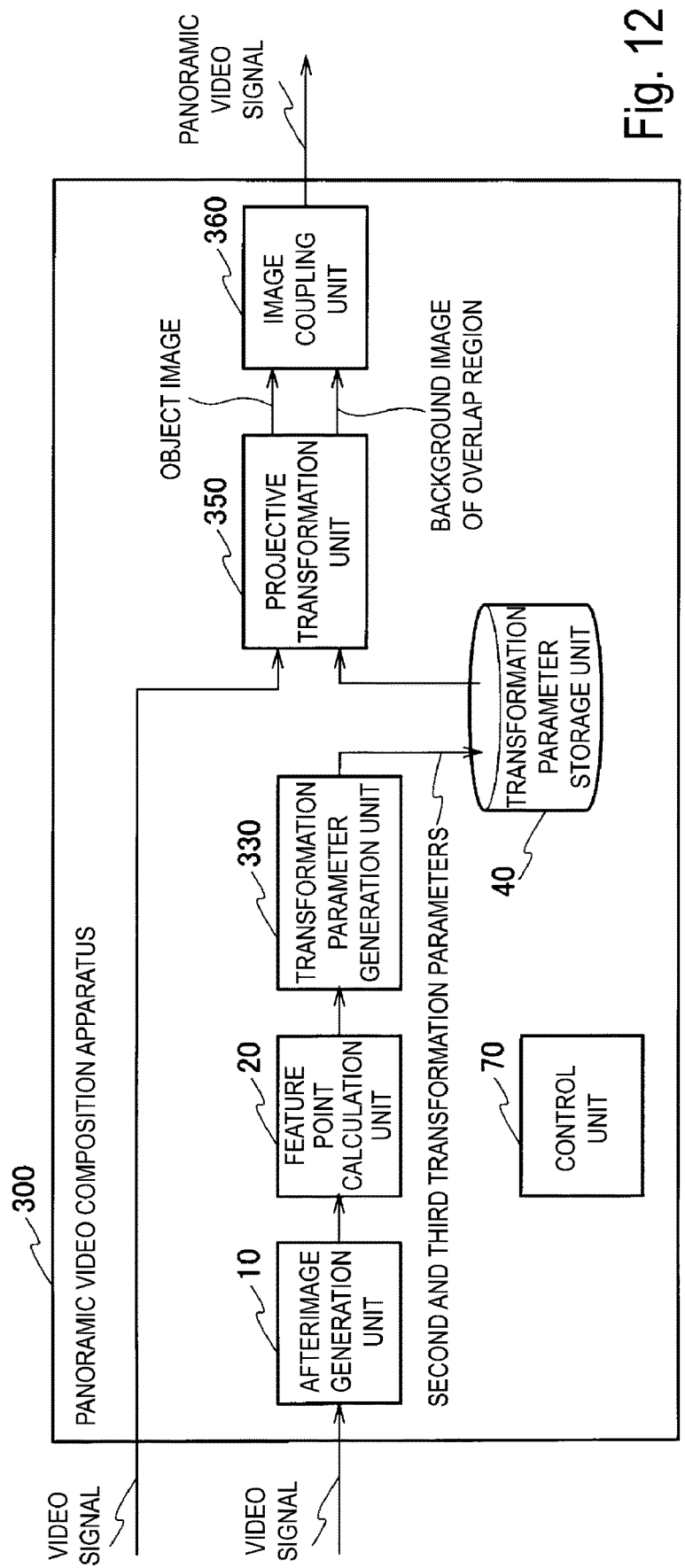
FIG. 12 is a block diagram illustrating a configuration example of a panoramic video composition apparatus according to a third embodiment of the present disclosure.

FIG. 12 is a block diagram illustrating a configuration example of a panoramic video composition apparatus according to a third embodiment of the present disclosure. The third embodiment differs from the above-described embodiment in that a panoramic video composition apparatus 300 illustrated in FIG. 12 includes a transformation parameter generation unit 330, a projective transformation unit 350, and an image coupling unit 360.

The transformation parameter generation unit 330 generates a second transformation parameter indicating a degree of distorting the frame image from differences between coordinates of feature points of which feature values included in the reference image KG match each other. The transformation parameter generation unit extracts coordinates of the object from the overlap region between the videos from the different angles of view, and generates a third transformation parameter indicating a degree of distorting the object from a difference between the coordinates. The second transformation parameter generated only from the differences between the coordinates of the feature points of the reference image KG differs from the first transformation parameter generated from the differences between the coordinates of the sets of feature points.

The second transformation parameter and the third transformation parameter are written to and stored in the transformation parameter storage unit 40.

The projective transformation unit 350 performs projective transformation of the frame images based on the second transformation parameter, and extracts an object image from the overlap region α in which projective transformation is performed based on the third transformation parameter. The projective transformation unit 350 extracts a background image BGα of the overlap region α between the angles of view. The background image BGα may be acquired by calculation for performing projective transformation on a portion of the background image BGα corresponding to the overlap region α.

The original image of the background image BGα extracted by the projective transformation unit 350 may be the frame image on which the projective transformation is performed by using the second transformation parameter as long as the frame image is an image in which the object R does not appear, or may be the frame image on which the projective transformation is not performed.

Processing for extracting only a specific object from the overlap region α may be processing identical to the processing for extracting the moving region (object) by calculating the difference between the frame image and the background image BGα by the afterimage generation unit 10.

The image coupling unit 360 generates a panoramic video image by generating an initial panoramic image on which the frame images on which the projective transformation is performed by using the second transformation parameter are coupled, superimposing the background image of the overlap region on the initial panoramic image, and then superimposing the object image. The panoramic video image is generated for each frame image, and thus, an output of the image coupling unit 360 is a panoramic video signal.

Figure 13:
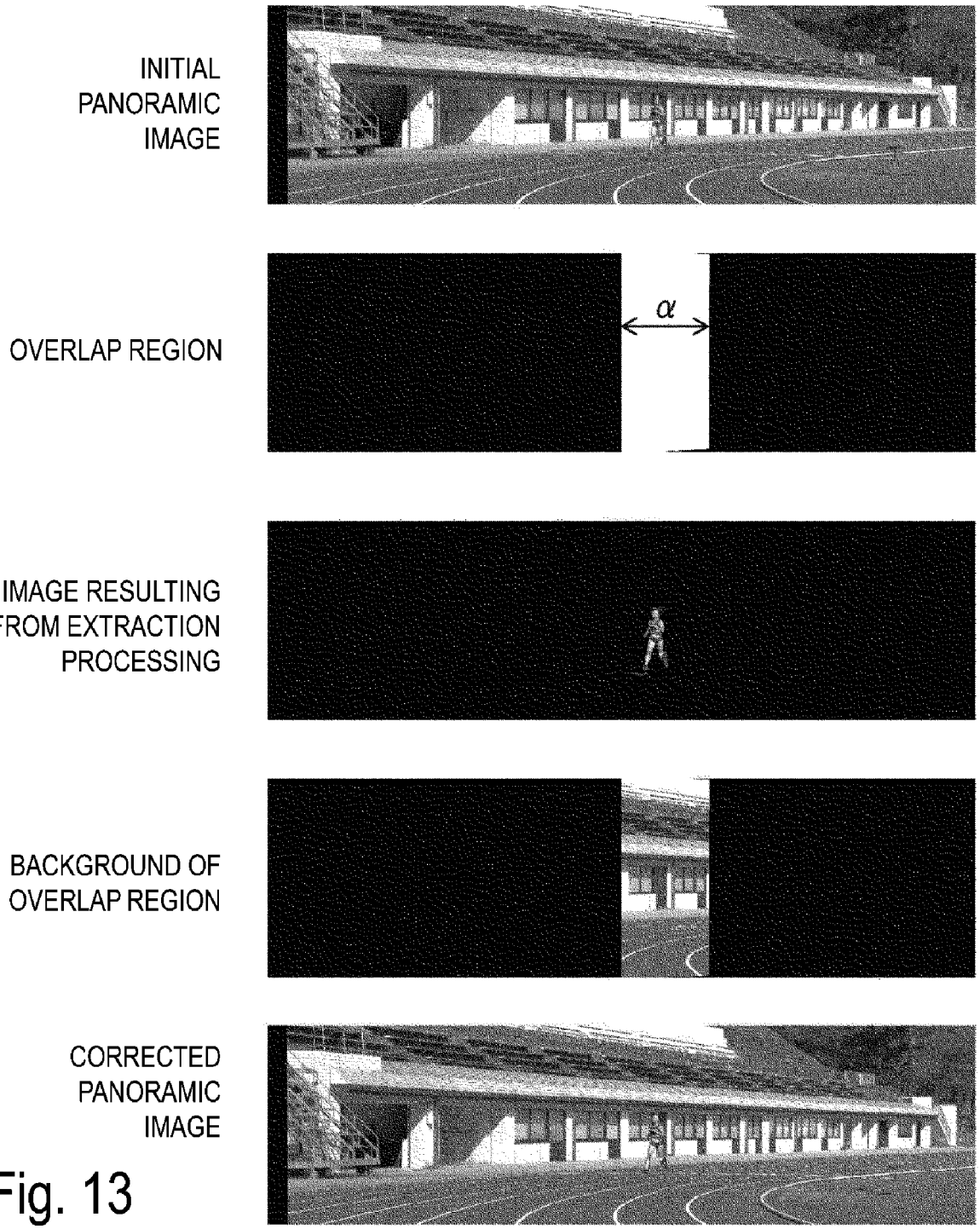
FIG. 13 is a diagram schematically illustrating an example of a panoramic image composed by the panoramic video composition apparatus illustrated in FIG. 10.

FIG. 13 is a diagram schematically illustrating an example of the panoramic image composed by the panoramic video composition apparatus 300. A first row of FIG. 13 illustrates the initial panoramic image. A second row illustrates the overlap region a between the left eye camera $C_L$ and the right eye camera $C_R$. A third row illustrates the object image obtained by performing the projective transformation on the image of the object extracted from the overlap region α based on the third transformation parameter. A fourth row illustrates the background image BGα of the overlap region α. A fifth row illustrates the panoramic video image.

As stated above, the background image of the overlap region α is superimposed on the initial panoramic image, and the object image in which the misalignment of the object is corrected is superimposed. In accordance with this method, the image on which the misalignment of the object image is appropriately corrected is superimposed on the background image BGα, and thus, the panoramic image with a small misalignment may be generated.

As described above, the panoramic video composition apparatus 100 according to the first embodiment of the present disclosure is a panoramic video composition apparatus that composes the panoramic video by coupling the plurality of videos. The panoramic video composition apparatus includes the afterimage generation unit 10, the feature point calculation unit 20, and the transformation parameter generation unit 30. The afterimage generation unit 10 acquires the background image BG as the background and the reference image KG as the reference of the panoramic video from the frame images constituting the video for each of the videos from the different angles of view, extracts the moving regions in which the object moves from the differences between the background image BG and the frame images, and generates the afterimage ZG by overlapping the extracted moving regions in order of the frame images. The feature point calculation unit 20 obtains the plurality of feature points from each of the reference image KG and the afterimage ZG, generates the set of feature points by adding the feature points, and calculates the feature value of each feature point. The transformation parameter generation unit 30 searches for feature points of which feature values match each other by comparing the feature points of the set of feature points before and after the frame image, and generates the first transformation parameter indicating the degree of distorting the frame image from the differences between the coordinates of the feature points.

Thus, both the reference image KG and the afterimage ZG may be distorted in the well-balanced manner, and the panoramic image with the small misalignment on which the misalignment between the angles of view may be obtained. Even though the object is a small object, the afterimage is generated from the moving regions, and thus, an area sufficient for detecting the feature points may be ensured. As a result, the frame images may be appropriately superimposed. Even when there is the object that traverses the overlap region α at a depth different from the background, the panoramic video may be generated by coupling the plurality of videos in which parts of the capturing regions are overlapped with high accuracy.

The panoramic video composition apparatus 200 according to the second embodiment of the present disclosure includes the afterimage generation unit 210. The afterimage generation unit 210 performs the projective transformation on the frame images constituting the video for each of the videos from the different angles of view based on the first transformation parameter, acquires the mismatching regions between the angles of view of the frame images on which the projective transformation is performed, performs the projective transformation for returning the mismatching regions to the original frame images, and generates the afterimage by superimposing images on which the non-overlap regions and the non-moving regions in the mismatching regions returned to the original frame images are masked in order of the frame images. Thus, the image of the portion with the large misalignment between the angles of view may be intensively corrected. Even when the object R appears in the frame image and the background image BG may not be acquired, the moving region is not extracted from the background image BG, and thus, the afterimage ZG may be generated.

The panoramic video composition apparatus 300 according to the third embodiment of the present disclosure includes the transformation parameter generation unit 330, the projective transformation unit 350, and the image coupling unit 360. The transformation parameter generation unit 330 generates the second transformation parameter indicating the degree of distorting the frame image from the differences between the coordinates of feature points of which feature values included in the reference image KG match each other, extracts the coordinates of the object from the overlap region α in the videos with the different angles of view, and generates the third transformation parameter indicating the degree of distorting the object from the difference between the coordinates. The projective transformation unit 350 performs the projective transformation of the frame images based on the second transformation parameter, extracts the object image from the overlap region a on which the projective transformation is performed based on the third transformation parameter, and extracts the background image BGα of the overlap region α. The image coupling unit 360 generates a panoramic video image by generating an initial panoramic image on which the frame images on which the projective transformation is performed by using the second transformation parameter are coupled, superimposing the background image BGα of the overlap region α on the initial panoramic image, and then superimposing the object image. Thus, the image on which the misalignment of the object image is appropriately corrected is superimposed on the background image BGα, and thus, the panoramic image with the small misalignment may be generated.

Characteristic functional units of the panoramic video composition apparatuses 100, 200, and 300 according to the present embodiment may be achieved by a computer including a ROM, a RAM, a CPU, and the like. In this case, processing details of functions necessary for the functional units are described in a panoramic video composition program. Such a panoramic video composition program may be distributed via a recording medium such as a CD-ROM or a transmission medium such as the Internet.

Needless to say, the present disclosure includes various embodiments and the like that are not described herein. Although it has been described in the above-described embodiments that the videos captured by two camera devices of the left eye camera $C_L$ and the right eye camera $C_R$ are coupled, the present disclosure is not limited to this example. The number of camera devices may be two or more.

Although it has been described in the aforementioned embodiments that the videos are input in two steps of the pre-processing and the post-processing, the panoramic video may be composed by inputting the videos in one step. In this case, the processing speed of the computer constituting the panoramic video composition apparatus of the present disclosure may be increased, and thus, the first transformation parameter may be generated before the frame image is updated.

As stated above, the present disclosure is not limited to the aforementioned embodiments. Thus, the technical scope of the present disclosure is defined only by matters for specifying the disclosure related to the claims appropriate from the above description.

REFERENCE SIGNS LIST

10, 210 Afterimage generation unit
20 Feature point calculation unit 30, 230 Transformation parameter generation unit
40 Transformation parameter storage unit
50, 350 Projective transformation unit
60, 360 Image coupling unit
70 Control unit
100, 200, 300 Panoramic video composition apparatus

The invention claimed is:

1. A panoramic video composition apparatus for composing a panoramic video by coupling a plurality of videos, the panoramic video composition apparatus comprising:
   an afterimage generation unit, including one or more processors, configured to acquire a background image as a background and a reference image as a reference of the panoramic video from frame images constituting a video for each of videos from different angles of view, extract moving regions in which an object moves from differences between the background image and the frame images, and generate an afterimage by overlapping the extracted moving regions in order of the frame images;
   a feature point calculation unit, including one or more processors, configured to obtain a plurality of feature points from each of the reference image and the afterimage, generate a set of feature points by adding the feature points, and calculate a feature value of each feature point;
   a transformation parameter generation unit, including one or more processors, configured to search for feature points of which feature values match each other by comparing the feature points of the set of feature points before and after the frame image, generate a first transformation parameter indicating a degree of distorting the frame image from differences between coordinates of the feature points, and generate a second transformation parameter indicating a degree of distorting the frame image from differences between coordinates of the feature points of which the feature values included in the reference image match each other, extract coordinates of the object from an overlap region between the videos from the different angles of view, and generate a third transformation parameter indicating a degree of distorting the object from a difference between the coordinates;
   a projective transformation unit, including one or more processors, configured to perform projective transformation of the frame images based on the second transformation parameter, extract an object image from the overlap region on which projective transformation is performed based on the third transformation parameter, and extract a background image of the overlap region; and
   an image coupling unit, including one or more processors, configured to generate a panoramic video image by generating an initial panoramic image on which the frame images on which the projective transformation is performed by using the second transformation parameter are coupled, superimposing the background image of the overlap region on the initial panoramic image, and then superimposing the object image.

2. The panoramic video composition apparatus according to claim 1, wherein
   the afterimage generation unit is configured to perform projective transformation on the frame images constituting each of the videos from the different angles of view based on the first transformation parameter, acquire mismatching regions between the angles of view of the frame images on which the projective transformation is performed, perform projective transformation for returning the mismatching regions to an original frame images, and generate an afterimage by superimposing images on which non-overlap regions and non-moving regions in the mismatching regions returned to the original frame images are masked in order of the frame images.

3. A panoramic video composition method performed at a panoramic video composition apparatus, the panoramic video composition method comprising:
   acquiring a background image as a background and a reference image as a reference of a panoramic video from frame images constituting a video for each of videos from different angles of view, extracting moving regions in which an object moves from differences between the background image and the frame images, and generating an afterimage by overlapping the extracted moving regions in order of the frame images;
   obtaining a plurality of feature points from each of the reference image and the afterimage, generating a set of feature points by adding the feature points, and calculating a feature value of each feature point;
   searching for feature points of which feature values match each other by comparing the feature points of the set of feature points before and after the frame image, and generating a first transformation parameter indicating a degree of distorting the frame image from differences between coordinates of the feature points;
   generating a second transformation parameter indicating a degree of distorting the frame image from differences between coordinates of the feature points of which the feature values included in the reference image match each other, extracting coordinates of the object from an overlap region between the videos from the different angles of view, and generating a third transformation parameter indicating a degree of distorting the object from a difference between the coordinates;
   performing projective transformation of the frame images based on the second transformation parameter, extracting an object image from the overlap region on which projective transformation is performed based on the third transformation parameter, and extracting a background image of the overlap region; and
   generating a panoramic video image by generating an initial panoramic image on which the frame images on which the projective transformation is performed by using the second transformation parameter are coupled, superimposing the background image of the overlap region on the initial panoramic image, and then superimposing the object image.

4. A non-transitory computer readable storage medium having stored thereon a panoramic video composition program causing a computer to function as a panoramic video composition apparatus to perform operations comprising:
   acquiring a background image as a background and a reference image as a reference of the panoramic video from frame images constituting a video for each of videos from different angles of view, extract moving regions in which an object moves from differences between the background image and the frame images, and generate an afterimage by overlapping the extracted moving regions in order of the frame images;
   obtaining a plurality of feature points from each of the reference image and the afterimage, generate a set of feature points by adding the feature points, and calculate a feature value of each feature point;

searching for feature points of which feature values match each other by comparing the feature points of the set of feature points before and after the frame image, generate a first transformation parameter indicating a degree of distorting the frame image from differences between coordinates of the feature points;

generating a second transformation parameter indicating a degree of distorting the frame image from differences between coordinates of the feature points of which the feature values included in the reference image match each other, extracting coordinates of the object from an overlap region between the videos from the different angles of view, and generating a third transformation parameter indicating a degree of distorting the object from a difference between the coordinates;

performing projective transformation of the frame images based on the second transformation parameter, extracting an object image from the overlap region on which projective transformation is performed based on the third transformation parameter, and extracting a background image of the overlap region; and generating a panoramic video image by generating an initial panoramic image on which the frame images on which the projective transformation is performed by using the second transformation parameter are coupled, superimposing the background image of the overlap region on the initial panoramic image, and then superimposing the object image.

5. The non-transitory computer readable storage medium according to claim 4, wherein the operations further comprise:

performing projective transformation on the frame images constituting each of the videos from the different angles of view based on the first transformation parameter, acquiring mismatching regions between the angles of view of the frame images on which the projective transformation is performed, perform projective transformation for returning the mismatching regions to an original frame images, and generating an afterimage by superimposing images on which non-overlap regions and non-moving regions in the mismatching regions returned to the original frame images are masked in order of the frame images.

6. The panoramic video composition method according to claim 3, further comprising:

performing projective transformation on the frame images constituting each of the videos from the different angles of view based on the first transformation parameter, acquiring mismatching regions between the angles of view of the frame images on which the projective transformation is performed, performing projective transformation for returning the mismatching regions to an original frame images, and generating an afterimage by superimposing images on which non-overlap regions and non-moving regions in the mismatching regions returned to the original frame images are masked in order of the frame images.

* * * * *